United States Patent [19]
Glaschick

[11] Patent Number: 5,475,625
[45] Date of Patent: Dec. 12, 1995

[54] METHOD AND ARRANGEMENT FOR MONITORING COMPUTER MANIPULATIONS

[75] Inventor: Rainer Glaschick, Paderborn, Germany

[73] Assignee: Siemens Nixdorf Informationssysteme Aktiengesellschaft, Munich, Germany

[21] Appl. No.: 340,808

[22] Filed: Nov. 17, 1994

Related U.S. Application Data

[63] Continuation of Ser. No. 87,786, Jul. 13, 1993, abandoned.

[30]  Foreign Application Priority Data

Jan. 16, 1991 [DE] Germany .......................... 41 01 141.4

[51] Int. Cl.⁶ ................................................. G05B 15/00
[52] U.S. Cl. ......................... 395/600; 364/550; 364/579; 395/187.01; 395/200.11
[58] Field of Search .................................... 364/550, 579, 364/580, 514; 371/19; 395/325, 575; 380/3, 4, 20, 49, 50, 23, 24, 25, 30; 340/825.29, 3, 31

[56]  References Cited

U.S. PATENT DOCUMENTS

| | | |
|---|---|---|
| 4,797,885 | 1/1989 | Orimo et al. .......................... 371/19 |
| 4,799,153 | 1/1989 | Hann et al. ........................... 364/200 |
| 5,022,028 | 6/1991 | Edmonds et al. ........................ 371/19 |
| 5,113,499 | 5/1992 | Ankney et al. ......................... 395/325 |
| 5,140,634 | 8/1992 | Guillou et al. ........................ 380/23 |
| 5,237,609 | 8/1993 | Kimura .................................. 380/3 |
| 5,237,677 | 8/1993 | Hirasawa et al. ...................... 395/575 |
| 5,289,540 | 2/1994 | Jones ................................. 380/50 |
| 5,295,187 | 3/1994 | Miyoshi ................................ 380/3 |
| 5,319,362 | 6/1994 | Hyatt, Jr. ......................... 340/825.31 |

*Primary Examiner*—Emanuel T. Voeltz
*Assistant Examiner*—Hal P. Wachsman
*Attorney, Agent, or Firm*—Hill, Steadman & Simpson

[57] ABSTRACT

Method and arrangement for monitoring manipulations on computers (3) which are connected via a network (2), in the method attributes being inquired automatically from databases of the computers (3) and compared with protectedly stored reference values of the attributes, and an alarm being triggered in the event of non-correspondence. The inquiry, the comparison and the alarm triggering are carried out by a monitoring device (1) which is physically not accessible to intruders, is connected to the computers (3) and the databases of which, containing the reference values, cannot be interrogated.

18 Claims, 7 Drawing Sheets

FIG. 4

| Check | Attributes | Owner | Size | Date | | | Filename |
|---|---|---|---|---|---|---|---|
| 53262 | -rwxr-xr-x | bin | 1982 | Jan | 2 | 1987 | /bin/cat |
| 10001 | -rwxr-xr-x | bin | 2838 | Jan | 2 | 1987 | /bin/cp |
| 54895 | -rwxr-xr-x | bin | 738 | Jan | 2 | 1987 | /bin/getlf |
| 44447 | -rwxr-xr-x | bin | 7796 | Jan | 2 | 1987 | /bin/ls |
| 49875 | -rwxr-xr-x | bin | 25 | Aug | 26 | 1987 | /bin/m |
| 46614 | -rwsr-xr-x | root | 1862 | Jan | 2 | 1987 | /bin/mkdir |
| 53693 | -rwxr-xr-x | bin | 2792 | Jan | 2 | 1987 | /bin/rm |
| 22095 | -rwxr-xr-x | bin | 23252 | Jan | 2 | 1987 | /bin/sh |
| 49138 | -rwxr-xr-x | bin | 492 | Jan | 2 | 1987 | /bin/sync |
| 20799 | -rwxr-xr-x | bin | 23 | Aug | 26 | 1987 | /bin/u |
| 17310 | -rw-r--r-- | bin | 20 | Aug | 26 | 1987 | /etc/message |
| 39939 | -rwsr-xr-x | root | 1720 | Jan | 2 | 1987 | /etc/mount |
| 32521 | -rw-r--r-- | bin | 167 | May | 13 | 1989 | /etc/passwd |
| 29946 | -rw-r--r-- | bin | 81 | Jan | 1 | 1970 | /etc/rc |
| 8244 | -rw-r--r-- | bin | 4 | Jan | 2 | 1987 | /etc/ttys |
| 15331 | -rwxr-xr-x | root | 3443 | Aug | 30 | 1987 | /etc/uhr |
| 35933 | -rwsr-xr-x | root | 1588 | Jan | 2 | 1987 | /etc/umount |
| 57110 | -rwxr-xr-x | bin | 926 | Jan | 2 | 1987 | /etc/update |

FIG.5

```
request_packet = record
            pathname: string;
        end;

reply_packet = record
            checksum: integer;
            attributes: word;
            owner: integer;
            modification: date;
            pathname: string;
        end;

procedure server;
    in: request_packet;
    out: reply_packet;

begin
        while get(in) do begin
            out.checksum = sum(in.pathname);
            out.attributes = get_from_dir(in.pathname, attr);
            out.owner = get_from_dir(in.pathname, ownr);
            out.modification = get_from_dir(in.pathname, mfd);
            put(out);
            end;
    end;
```

FIG. 6-1

```
request_packet = record
                   pathname: string;
                 end;

reply_packet = record
                  checksum: integer;
                  attributes: word;
                  owner: integer;
                  modification: date;
                  pathname: string;
                end;

line_in_file = record
                  checksum: integer;
                  attributes: word;
                  owner: integer;
                  modification: date;
                  pathname: string;
                end;

procedure check_one_system(sysname: string);
    in: request_packet;
    out: reply_packet;
    item: line_in_file;
    items: FILE;
    port: integer;
    ok : boolean;

begin
      port := open_server(sysname, "check_files");
      items := open(sysname);
```

FIG. 6-2

```
        while readline(item) do begin
                in.pathname := item.pathname ;
                send(port, in) ;
                out := receive(port) ;
                if   (out.checksum = item.checksum)
                and (out.attributes = item.attributes)
                and (out.owner = item.owner)
                and (out.access = item.access)
                then continue ;
                /* !!!! Difference found !!!! */
                Alarm(sysname, item.pathname) ;
                end ;
        end ;

procedure main ;
    sysname : string ;
    begin
            while read_next_sysname(sysname) do begin
                if EOF then exit ;
                check_one_system(sysname) ;
                end ;
    end ;
```

METHOD AND ARRANGEMENT FOR MONITORING COMPUTER MANIPULATIONS

This is a continuation of application Ser. No. 087,786, filed Jul. 13, 1993, now abandoned which is a continuation of PCT/EP 02/00061 filed Jan. 14, 1992.

BACKGROUND OF THE INVENTION

The present invention relates to a method and an arrangement for monitoring manipulations on computers which are connected via a network.

Manipulations on computers are intended to refer in particular to changes to executable programs by non-authorized persons, that is for example the "infecting" of computers with "viruses" or "Trojan horses".

To check whether manipulations have taken place on a computer, the following possibilities are known:

Regular manual inspection of the databases. This effort is justified only for cases particularly at risk or relevant to security.

The use of classified operating systems. Classified operating systems are those which correspond to the American "Trusted Computer System Evaluation Criteria", the German "IT-Sicherheitskriterien" (IT Security Criteria) or similar codes of practice. Classified operating systems have, starting from certain classes, built-in security levels which hinder manipulations. For example, from Class B2 of the abovementioned "Trusted Computer System Evaluation Criteria", so-called "access control lists" are prescribed, which allow a finer graduation of write privileges. Prescribed protocol files facilitate the detection of manipulations, but do not prevent them. If an intruder succeeds nevertheless in acquiring the appropriate privileges, he can manipulate files just as in conventional systems.

Sealing of files and file directories by signatures and checking upon access. Such sealing is known, for example, from German reference 3,736,760 or from European Patent 0,137,075. In order to achieve adequate security, checking of the sealing cannot be performed at the user level but must be carried out by an operating system specifically modified for this. It is assumed here that the operating system is not manipulated by an intruder. This method remains problematical if the sealing can be produced on the computer itself, because then an intruder can himself produce new seals for the manipulated files. In the IBM operating system MVS it is possible, for example, to protect against manipulation by only allowing marked files to be altered after agreement by the system manager. This possibility, however, requires a great system-administrative effort in order for the agreement of the system manager to be always possible at the suitable time.

Automation of routine inspection which attributes of databases of the computers are automatically inquired and compared with protectedly stored reference values of the attributes and in which, in the event of non-correspondence, an alarm is triggered. Checksums or other attributes concerning the files to be protected are stored on the computer to be monitored in a protected file and verified at regular intervals by a program. This method is desirable insofar as it means no personnel effort and makes do without intervention in the operation system. It has the disadvantage, however, that it does not offer suitable protection against intruders. Once an intruder has gained access to the computer, he will tend to inform himself as to which security mechanisms there are. One of the first manipulations would be to eliminate these protective mechanisms, since the automatic inspection virtually cannot be concealed. This is generally practicable for the intruder because the program which is intended to verify the files to be protected is on the computer itself and is consequently open to manipulations.

SUMMARY OF THE INVENTION

It is the object of the invention to provide a method and an arrangement by which the possibility of unnoticed manipulation on computers connected via a network can be reduced and which operate with a standard operating system.

In general terms the present invention is a method and apparatus for monitoring manipulations on computers which are connected via a network, in which attributes of databases of the computers are automatically inquired and compared with protectedly stored reference values of the attributes and in which, in the event of non-correspondence, an alarm is triggered. In the method of the present invention the inquiry, the comparison and the alarm triggering are carried out by a monitoring device, such as a monitoring computer that is physically not accessible to intruders. The monitoring computer is connected to the computers and the databases of which, containing the reference values, cannot be interrogated, the inquiry preferably taking place via the network.

Advantageous developments of the present invention are as follows.

The monitoring device inquires the database attributes of a plurality of computers in a time-interleaved manner and compares them with reference values.

The monitoring device carries out the inquiring of the database attributes at regular time intervals.

The monitoring device is a monitoring computer, which has at least one testing program and at least one file for the storing of names of the databases to be checked and of reference values of the attributes of the respective databases. The computers have in each case at least one service program, which calculates attributes of databases of the respective computer and outputs them via the network. The inquiring of an attribute is performed by the testing program issuing a job to the corresponding service program and comparing the attribute arriving via the network with the stored reference value of the attribute. The databases of the monitoring computer, which has no service program, cannot be interrogated. The communication between tester program and service program is encoded, preferably with changing codes produced according to the Diffie-Hellmann method. Before the inquiring of the database attributes, an authentication method runs, which ensures that the inquired attributes originate from the service programs.

Instead of a service program, each of the computers has stored only a loading program, which can load the service program. The service program is stored in the monitoring computer and, before the inquiry of the database attributes, is sent via the network to the loading program in the respective computer. The service program in the monitoring computer is subjected to a customary or cryptographic checksum before sending to the computer. The loading program extracts this checksum and sends it back to the monitoring computer for checking.

Upon triggering an alarm, a message is issued to the system administrator and/or the computer concerned is separated from the network.

The apparatus of the present invention is an arrangement for monitoring manipulations on computers which are connected via a network having an interrogation means for the automatic interrogation of databases of the computers, having means for comparing the attributes to rated values stored in protected fashion, and having an alarm triggering means that triggers an alarm given non-coincidence. The arrangement has a central monitoring device that is provided, which is physically not accessible to intruders, is connected to the computers and is set up in such a way that it can access the computers, but the computers cannot access the monitoring device. The monitoring device preferably has a monitoring computer connected to the computers via the network. The monitoring device also contains the interrogation means, the comparison means and the alarm triggering means.

The invention is based on the fact that, by the manipulation of databases (for example files and/or file directories), their attributes are also altered. The particular advantage lies in the principle that a monitoring device which is not accessible to intruders (for example a computer which is set up in a locked room to which only a very limited number of persons have access) is connected to the other computers in a valve-like manner. In this context, valve-like means that although the monitoring device can access the computers connected to the network, an intruder who has intruded into one of these computers cannot access the monitoring device. Consequently, there is a kind of superordinate monitoring level. A program for checking databases is thus not on the computer to be checked itself but in the protected monitoring device, which is preferably a monitoring computer. By this division, the effort necessary for intruders to switch off the protection without an alarm being triggered is increased considerably.

The method according to the invention is preferably used for files which are subject to a central administration, for example by a system manager. In particular parts of the operating system and the files controlling the system come under this. This protection is particularly important, since its manipulation can put the entire system at risk.

The inquiring of the database attributes by the monitoring device can be carried out automatically and at regular time intervals. In the case of another preferred embodiment, the enquiring can be carried out deliberately at irregular time intervals, so that an intruder cannot use the times between regular checks for manipulation.

The monitoring device preferably inquires the database attributes of a plurality of computers in a time-interleaved manner and compares them with reference values. This is beneficial in particular if the monitoring proceeds synchronously, that is, after issuing an inquiry, the monitoring device waits until the computer reports back the file attribute. For reasons of operational reliability, the monitoring device must contain a timer in order to detect absent acknowledgements and evaluate them as a failed inquiry. Since the reporting back of inquiries by the computers requires a certain time, it is advisable to issue the inquiries in a time-interleaved manner by the monitoring device.

According to a particularly preferred exemplary embodiment, the inquiry of the database attributes is realized by a so-called "client-server architecture". The monitoring device is a monitoring computer on which there is a tester program (client) and at least one file in which the databases to be checked and the respective reference values of their attributes are stored. On the computers to be tested there is implemented in each case at least one service program (server), which can, on request, calculate the attributes of the databases on this computer and report back via the network.

For communication between the computers there are usually also implemented on the computers service programs which permit an "entry" into the computer via the network. At least one such service program must not be implemented on the monitoring computer, in order to ensure the valve-like connection of the monitoring computer to the network.

The arrangement described thus far increases security considerably, without the operating system installed on the computers to be checked having to be modified.

An intruder can, however, record the communication between monitoring computer and computers to be checked and consequently reconstruct that file on the monitoring computer which is storing, inter alia, the reference values of the attributes. The possibility thus exists of an intruder replacing the service program on the computer to be checked by a service program which does not calculate the attributes of the databases on the computer at all but simply takes them from the reconstructed file. This aim cannot be achieved easily, however, since it must be assumed that an intruder can replace all the files and programs by his own and, if need be, also simulate the computer on the network.

In order, however, also to prevent such a manipulation, the security of the method according to the invention can be further increased by preferred embodiments.

A first preferred possibility of further security is to encode the communication via the network. Since, however, in a normal case it is always the same messages that are transmitted (for example since the file attributes of operating system files generally do not change), an encoding with changing codes is preferably used. These changing codes could be generated, for example, by the known methods of Diffie and Hellmann (W. Diffie and M. E. Hellmann, New Directions in Cryptography, I.E.E. Trans. Inf. Series, No. 6, November 1976, p. 140). This known method permits the generation of a common code for two subscribers through public dialog, without a listener being able to reconstruct the code.

Another preferred possibility for further increasing security is to allow a secure authentication protocol to run in order to open up communication between tester program and service program. Such an authentication protocol is known, for example, from German Offenlegungsschrift 3,817,484. In this case a secret code is enciphered in the service program by a simple method, for example by using an XOR operation to combine it with a fixed, likewise stored value.

A third possibility for increasing security is to integrate the service program for the calculation and output of the file attributes in a further, already existing service program, whereby the effort of an intruder increases considerably, since he then must replace a service program by one which must function unchanged for the services originally to be performed. If this does not happen, the maloperation would be noticed. Preferably, the program text of this extended service program can be transmitted to the monitoring computer before communication with the latter, where the actual program text is compared with a reference value.

A fourth possibility for increasing security is that no complete service programs for calculating the file attributes are implemented on the computers, but only loading programs. The actual service program is merely on the monitoring computer, which sends it to the loading program of a computer before the beginning of checking said computer. Consequently, an intruder cannot modify the service program, since it is not on the computer at all. In order to prevent an intruder from implementing a bogus loading program, which simply ignores the transmitted service program, the service program in the monitoring computer is preferably provided with a customary or a cryptographic checksum, which has to be given back by the loading program. For this purpose, before sending the service program, a random number may be entered in said program, so that each time a new checksum has to be transmitted. Alternatively, the checksum may be dispensed with and instead a changing code stored in the service program in a concealed manner for a symmetric encoding of the dialogs.

If in a test of the database attributes or of the authenticity of the computer to be checked a deviation is established, there are various possibilities of evaluation. For example, an entry may be made in a corresponding file. Also, a message may be sent to a system administrator. Alternatively, an alarm bell may be triggered. A further service program in the computer to be checked may be addressed and deactivate this computer. If a bus network, such as Ethernet, is used as the network, the computer can also be isolated from the network from the monitoring computer. For this purpose, a hardware device can constantly monitor the data packets on the network. If the computer sends a packet (or is to receive one), this can be detected by the hardware arrangement, since the packets bear the address of the computer in a certain position. The hardware device can then make the monitoring computer behave in a way which does not conform to the protocol, but disturbs the computer. Consequently, it is ensured in any event that the computer which has come under suspicion is isolated from the network.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 is an example of that file on the monitoring computer which contains files to be checked of a computer and examples of attributes assigned to these files;

FIG. 5 shows by way of example the pseudo code for a service program; and

FIG. 6-1 shows a first part and FIG. 6-2 shows a second part of the pseudo code for the tester program.

DESCRIPTION OF THE PREFERRED EMBODIMENT

Figure 1:
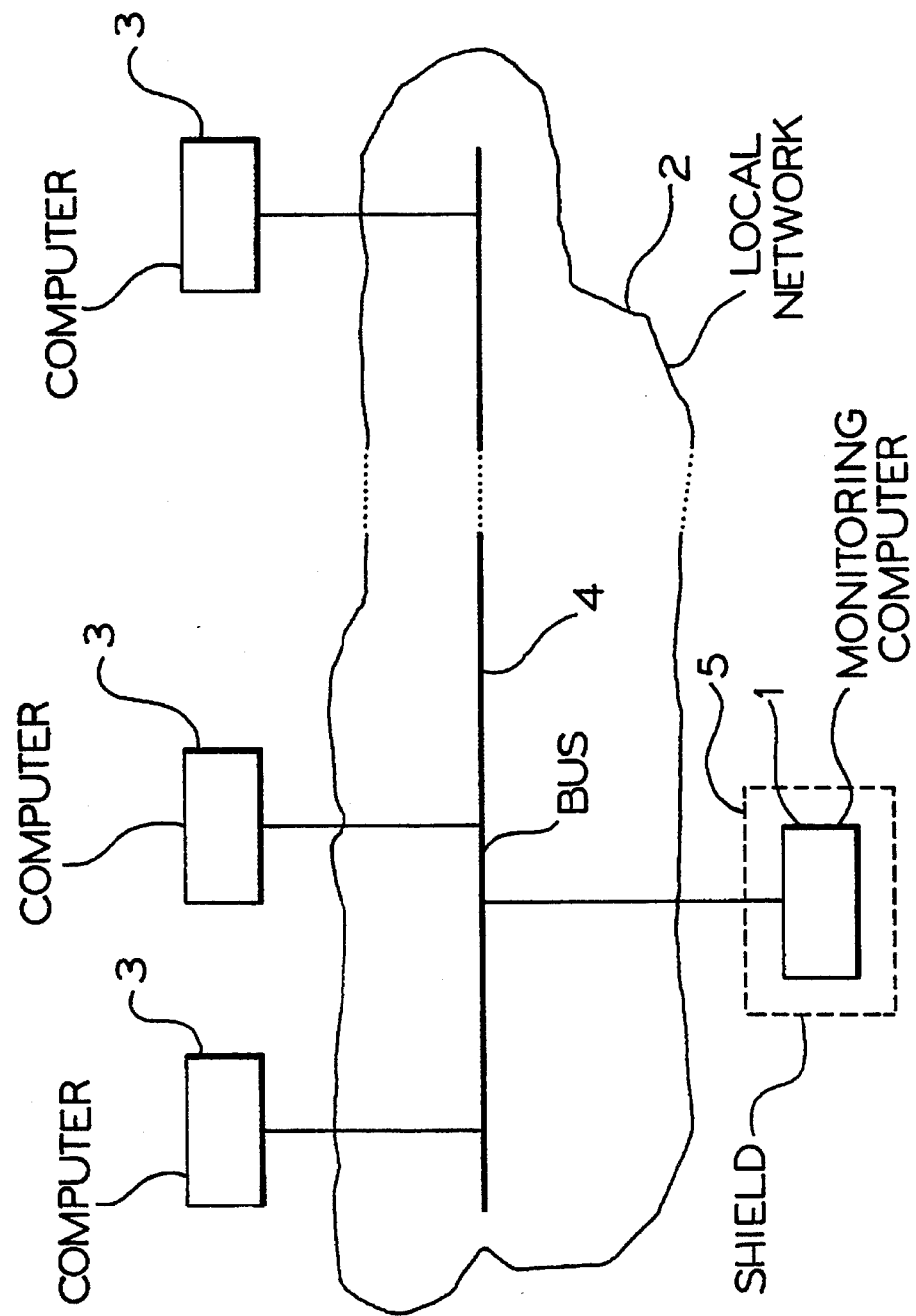
FIG. 1 is a diagrammatic representation of an embodiment of the arrangement of the invention.

FIG. 1 diagrammatically shows the arrangement according to the invention with a monitoring computer 1, which is connected via a (local) network 2 to one or more computers 3 to be checked. In the example, the bus system 4 "Ethernet" with the protocol TCP/IP is used as the local network; however, it is also possible to use other types of networks and the TCP/IP protocol may also be handled by means of serial lines and switching computers. The monitoring computer 1 is physically secured by a shield 5, so that no unauthorized access is possible to it. A special, lockable room to which only a known small number of employees have access may serve, for example, for this purpose.

Figure 2:
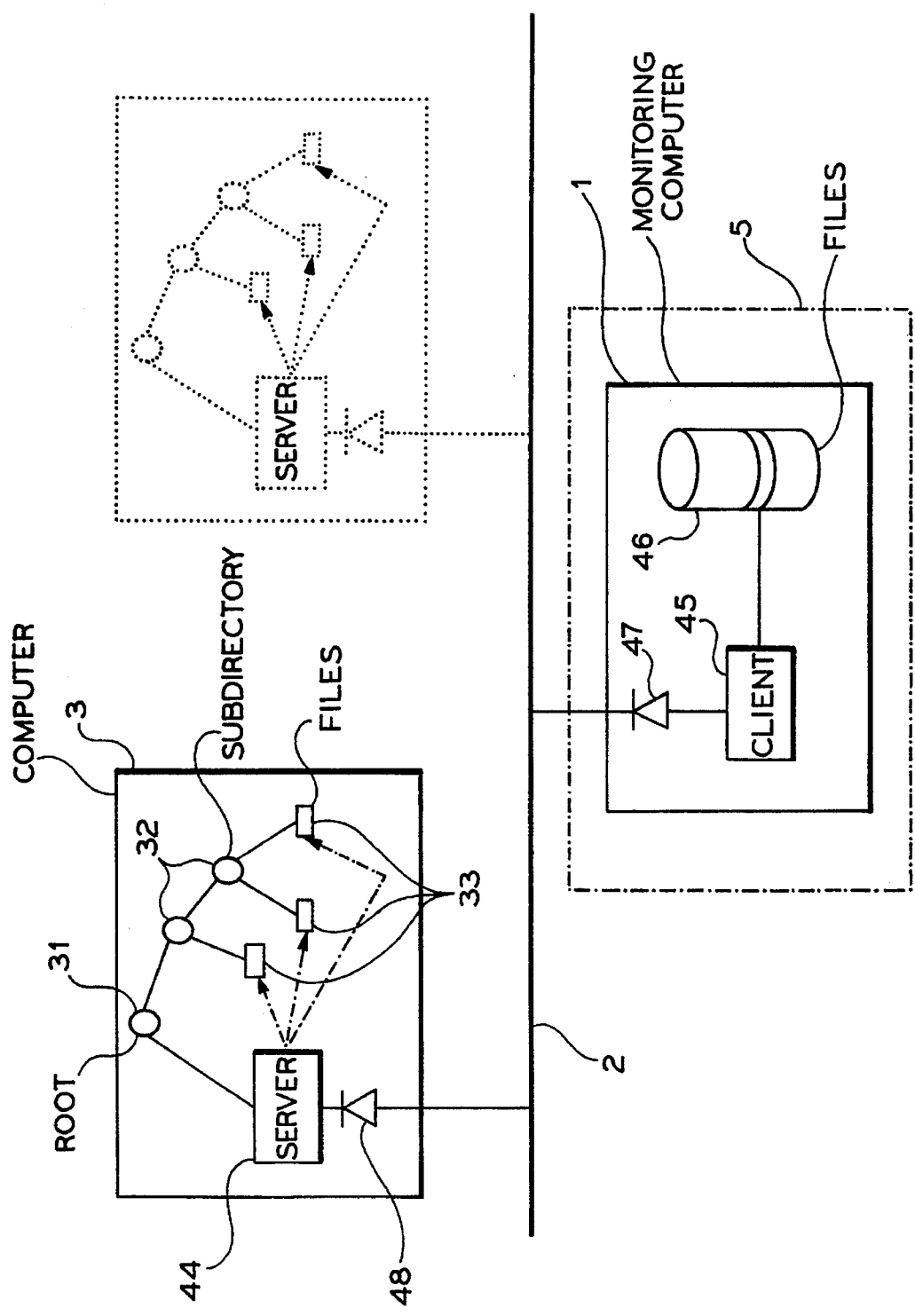
FIG. 2 is a detailed representation of the arrangement according to FIG. 1.

FIG. 2 shows a detailed representation of this arrangement, on which a client-server architecture is implemented by software. In the computer 3 to be checked there is a file tree with a root 31, subdirectories 32 and files 33. Also installed on this computer 3 is a service program (server) 44.

In the monitoring computer 1 there runs the tester program (client) 45, which receives from a file 46 the names and the reference attributes of the files to be checked in the computer. For each entry in the file 46, a request for calculation of the attributes of a file is sent to the service program 44, which for its part establishes the nominated file 33, determines its attributes and transmits them as a response back to the tester program 45. This response is compared by the tester program 45 to the reference values in the file 46.

The diode symbols 47 and 48 indicate the valve-like nature of the client-server architecture used. In this case, at least the diode symbol 48 is redundant. What is essential is that access cannot be made to the monitoring computer 1.

The monitoring computer 1 is configured in such a way that no service programs are active or can be activated on it. The monitoring computer is to this extent isolated from the network.

Apart from the service program 44 used for checking, further programs, that is also tester programs and service programs, may also be active on the computers 3. On the monitoring computer, further tester programs may be activated alternatively or in parallel, in order to allow the operating personnel, for example, dialog access to the computer to be tested.

Figure 3:
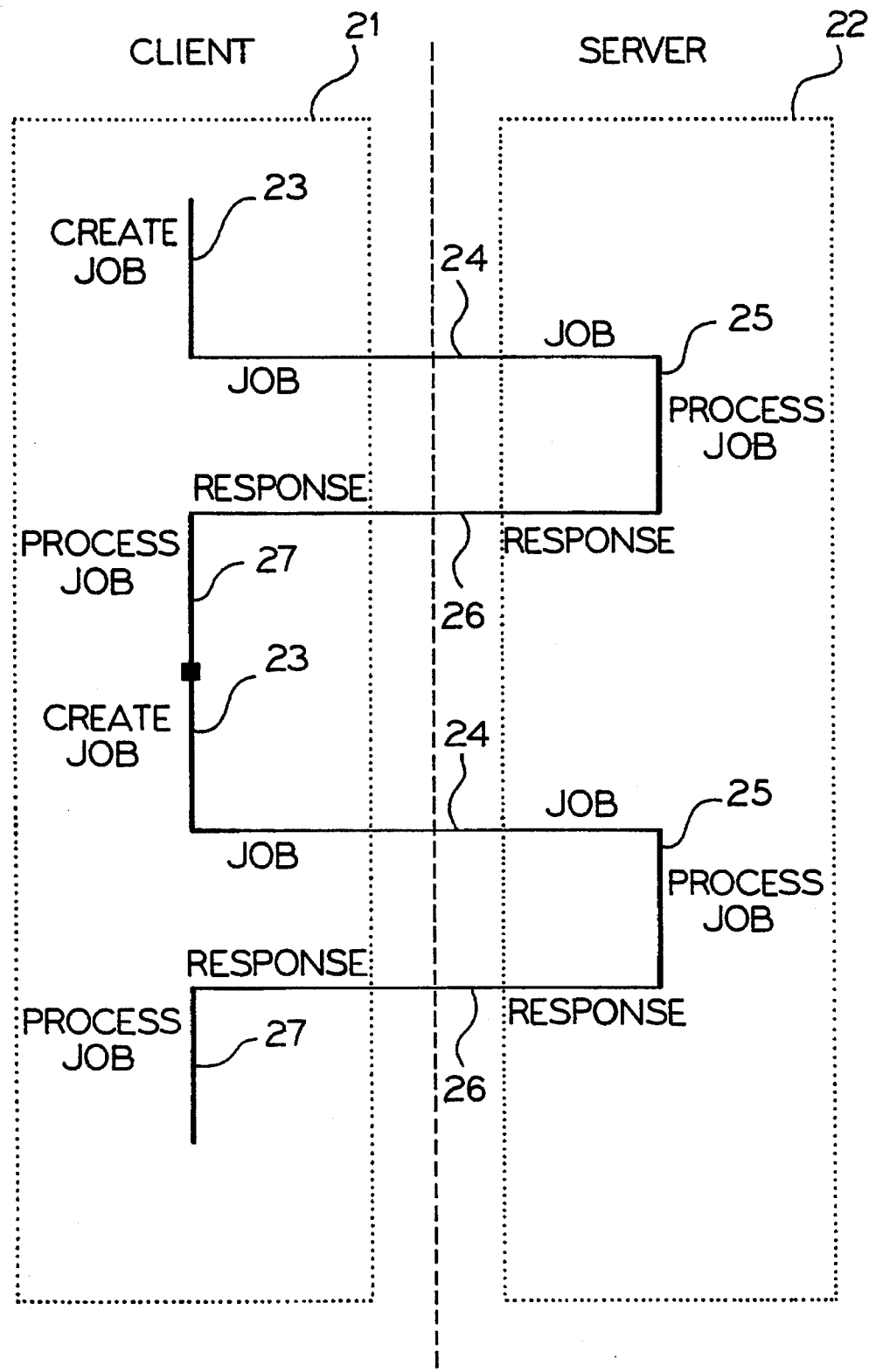
FIG. 3 is a diagrammatic representation of the sequence of communication between tester program and service program.

FIG. 3 diagrammatically shows the sequence of communication between the tester program 45 and the service program 44. The step "create job" 23 takes place in the tester program 45. The step "transmit job" 24 takes place via the network 2. The step "process job" 25 takes place in the service program 44, the step "report back job" 26 again takes place via the network 2 and the step "process job to conclusion" 27 again takes place in the tester program 46. As represented in FIG. 3, this sequence is repeated several times. In the present case, a job consists in establishing the attributes of a file on the computer 3 to be checked.

The jobs are usually carried out synchronously, ie. the service program 44 executes the job immediately and reports the result back to the tester program 45. Once the job has been sent via the network 2, the tester program 45 in turn waits for the response of the service program 44 to arrive. In order to increase computing capacity utilization, in particular of the monitoring computer 1, the jobs may also be issued to and received by the various computers in a time-interleaved manner.

In the case of applications which are critical in terms of computing time, the service program 44 may also form for a job a job file for later execution (batch job); due to the considerably greater time barrier, which can usually last up to one hour, the chance for an intruder to manipulate the job files does, however, increase considerably. This is generally simpler than manipulating the service program.

The client-server architecture is realized by software. In the case of synchronous execution, however, generally a network which provides fast transport functions will be required. Ethernet has the advantage that, with the access to the physical medium, the cable, access to all thus far connected computers is possible without a central configuration administration having to be activated. However, the type of network is immaterial for the proposed arrangement. The only condition is that the tester program 45 on the monitoring computer 1 can initiate the service program 44 on the computer 3 to be monitored and receives back a result. The valve effect between network 2 and monitoring computer 1 may also be produced by hardware; this solution is not so elegant, however, since it has to take place at a higher level. The monitoring computer 1 must namely receive responses from the computer 3 to be monitored, so that a bidirectional communication is necessary. A valve effect of the hardware would therefore have to act on the contents of the datablocks to be transmitted via the network. It is much simpler to configure the software on the monitoring computer 1 in such a way that it interprets the contents of the incoming data packets only within the scope of the monitoring protocol and does not allow general access.

The arrangement and method described above increase considerably security against unnoticed manipulations of computers connected to the network. Still further—reaching security can be achieved by— as already described—the communication between tester program 45 and service program 44 being encoded, preferably with changing codes,

- by a secure authentication protocol, for example according to Beth (German Patent 3,817,484) running before the actual handling of a job,
- by the service program 44 being incorporated in another, as complex as possible service program on the computer 3, or
- by the complete service program 44 not being available on the computer 3, but only a loading program, which receives the actual service program 44 from the monitoring computer 1.

If appropriate, these possibilities of further increasing security against computer manipulations can also be combined.

Regarding the individual possibilities of increasing security, the following further points are made.

An authentication method is not an encoding of a data interchange in the conventional sense. In the authentication method it is not the confidentiality of the data interchange that is to be secured, but the authenticity of the messages. It must thus be ensured that the expected response comes unfalsified from the accepted service program 44.

The method of the loading program allows the service program 44 to be provided with a constantly changing coding. This provides a better-secured code storage for the authentication protocols specified above, because the time span for extraction of the code and for incorporation in a bogus service program is less than if the service program is permanently on the monitoring computer. A bogus loading program is of no use to an intruder, since the latter has to bring about execution of the transmitted service program 44 in order to produce an authentic response back to the monitoring computer 1.

Symmetric encoding usually refers to a method in which one and the same code is used for encoding and decoding. As an example, the widely known American "Data Encryption Standard" (DES) may be mentioned.

A checksum of a conventional type, for example as a horizontal checksum or a cyclic code (cyclic redundancy check, CRC), allows for one file a second file to be constructed by simple means, the checksum of which second file is the same as that of the first file. A cryptographic checksum (to be more precise: a cryptographically secure checksum) refers to a method which calculates a checksum for a file, so that this calculation can be performed efficiently but it is virtually impossible to find a second file which has the same checksum. An example of this is the method by Juenemann, described in ISO Standard X500, part III.

It should further be noted that, to realize the client-server architecture discussed above, recently there has been increased use of a specific programming technique for realization of the program-to-program communication, which is referred to as "remote procedure call".

The types of the attributes of the databases used for checking have no influence on the invention; rather, they are one of the essential characteristics of the computer to be monitored. The continuous checking of the attributes alone, dispensing with checksums, offers a significant protection against manipulations, since many manipulation methods are known in which an alteration of the file attributes is accomplished.

FIG. 4 shows an example of the contents of a file 46, which contains the file names to be checked and respectively associated attributes, such as a checksum, priority attributes, the association, the size and the date of the file.

FIG. 5 shows an example of the pseudo code for a service program 44, and FIG. 6 shows an example of the pseudo code of a tester program 45.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method of monitoring manipulations on user computers which are connected via a network comprising the steps of: making a plurality of inquires at different respective time intervals, during operation of the user computers, and comparing attributes of databases of the user computers with protectedly stored reference values of the attributes and, in the event of non-correspondence, triggering an alarm; and carrying out the plurality of inquires, the comparison and the alarm triggering by a monitoring device, which is physically not accessible to intruders and which is isolated from the network to the extent that an intruder on the network cannot access the monitoring device from a user computer, the monitoring device being connected to the user computers, the databases of the user computer being not interrogatable other than by the monitoring device.

2. The method as claimed in claim 1, wherein the monitoring device inquires database attributes of the databases of a plurality of user computers in a time-interleaved manner, wherein at least two different inquiries are made before responses thereto are received, and compares the database attributes with the protectedly stored reference values.

3. The method as claimed in claim 1, wherein the monitoring device carries out the inquiring of the database attributes of the databases of the user computers at regular time intervals.

4. The method as claimed in claim 3, wherein each of the user computers has stored only a loading program, which can load a service program, and wherein the service program is stored in the monitoring device, which is a monitoring computer and wherein the method further comprises the step of sending the service program, before the inquiry of the database attributes, via the network to the loading program in a respective user computer.

5. The method as claimed in claim 4, wherein the method further comprises the steps of subjecting the service program in the monitoring computer to a customary or cryptographic checksum before sending to the respective user computer, and extracting by means of the loading program the checksum and sending the checksum back to the monitoring computer for checking.

6. The method as claimed in claim 1, wherein the monitoring device is a monitoring computer, which has at least one testing program and at least one file for storing names of databases to be checked and of protectedly stored reference values of the attributes of respective databases, wherein each of the user computers has at least one service program, which calculates attributes of databases of a respective computer and outputs the calculated attributes via the network, wherein inquiring of an attribute is performed by the at least one testing program issuing a job to a corresponding service program and comparing the calculated attribute arriving via the network with a stored reference value of the attribute, and wherein databases of the monitoring computer, which has no service program, cannot be interrogated by the user computers.

7. The method as claimed in claim 6, wherein the method further comprises the step of encoding communication between the testing program and the at least one service.

8. The method as claimed in claim 7, wherein the communication is encoded with changing codes produced according to a Diffie-Hellmann method.

9. The method as claimed in claim 6, wherein the method further comprises the step of running, before the inquiring of database attributes of the databases, an authentication method, which ensures that the inquired attributes originate from the at least one service program.

10. The method as claimed in claim 1, wherein the method further comprises the step of issuing, upon triggering an alarm, a message to a system administrator.

11. The method as claimed in claim 1, wherein the monitoring device is a monitoring computer.

12. The method as claimed in claim 1, wherein the step of inquiring takes place via the network.

13. The method as claimed in claim 1, wherein the method further comprises a step of separating, upon triggering an alarm, a user computer associated with the alarm from the network.

14. An arrangement for monitoring manipulations on user computers which are connected via a network, comprising: an interrogation means for automatic interrogation of the databases of the user computers at different respective time intervals, during operation of the user computers, a means for comparing attributes of the databases of the user computers to rated values stored in protected fashion, and an alarm triggering means that triggers an alarm given non-coincidence of the attributes of the databases and the rated values, said alarm triggering means being responsive to said means for comparing that utilizes the attributes of the databases that are determined by the interrogation means; a central monitoring device, which is physically not accessible to intruders and which is isolated from the network to the extent that an intruder on the network cannot access the monitoring device from a user computer, connected to the user computers, means for providing that the monitoring device can access the user computers without the user computers being able to access the monitoring device, the monitoring device connected to the user computers via the network and containing the interrogation means, the means for comparing and the alarm triggering means.

15. The arrangement as claimed in claim 14, wherein the monitoring device is a monitoring computer.

16. A method of monitoring manipulations on a plurality of user computers which are connected via a network in a client-server architecture, comprising the steps of:

providing a monitoring device having a plurality of reference values stored therein and being configured such that no service programs in the client-server architecture are active or are activatable on the monitoring device;

connecting the monitoring device to a respective user computer of said plurality of user computers such that the monitoring device initiates communication at different points in time with said respective user computer, and receives only answers from said respective user computer, a connection being established between the monitoring device and the respective user computer such that an intruder on the network cannot access the monitoring device from the respective user computer;

sending a request from the monitoring device to the respective user computer, the respective user computer calculating an attribute of a database stored therein and sending said attribute to the monitoring device;

comparing, in the monitoring device, the calculated attribute to at least one of the reference values in the monitoring device;

and, in the event of non-correspondence between the calculated attribute and the at least one of the reference values, triggering an alarm.

17. The method as claimed in claim 16, wherein the monitoring device initiates execution of a process in the respective user computer, wherein the respective user computer cannot initiate execution of a process in the monitoring device, wherein an attribute received by the monitoring device from the respective user computer is only compared with said reference values, and wherein said method further comprises preventing the reference values stored in the monitoring device from being changed by any messages received from the respective user computer.

18. The method as claimed in claim 17, wherein the monitoring device sends requests to the user computers at random points in time relative to the user computers of the plurality of user computers.

* * * * *